US007057977B1

(12) United States Patent
Muller

(10) Patent No.: US 7,057,977 B1
(45) Date of Patent: Jun. 6, 2006

(54) FLEXIBLE BRIDGE FOR A WATCH MODULE

(75) Inventor: Jacques Muller, Geneuille (FR)

(73) Assignee: Timex Group B.V. (NL)

(*) Notice: Subject to any disclaimer, the term of this patent is extended or adjusted under 35 U.S.C. 154(b) by 256 days.

(21) Appl. No.: 10/342,889

(22) Filed: Jan. 15, 2003

(51) Int. Cl.
*G04C 23/02* (2006.01)
*H02K 37/00* (2006.01)

(52) U.S. Cl. ........................ 368/88; 368/316; 368/318; 310/112

(58) Field of Classification Search .................. 368/88, 368/139, 155, 157, 297, 299, 300, 316, 318, 368/327; 310/112, 114, 49 R
See application file for complete search history.

(56) References Cited

U.S. PATENT DOCUMENTS

| | | | | |
|---|---|---|---|---|
| 2,685,164 | A * | 8/1954 | Grillet et al. | 368/318 |
| 3,945,197 | A * | 3/1976 | Erard | 368/300 |
| 4,023,348 | A * | 5/1977 | Giger et al. | 368/88 |
| 4,143,507 | A * | 3/1979 | Ganter et al. | 368/34 |
| 5,369,627 | A * | 11/1994 | Ikegami | 368/88 |
| 6,381,198 | B1 * | 4/2002 | Born | 368/157 |

* cited by examiner

*Primary Examiner*—Kamand Cuneo
*Assistant Examiner*—Jeanne-Marguerite Goodwin
(74) *Attorney, Agent, or Firm*—Carmody & Torrance LLP

(57) ABSTRACT

A one-piece molded plastic bridge for use in a timepiece module that itself comprises a frame assembly, at least two stepping motors each comprising at least a stator and rotor, and a plurality of gears assemblies, is provided. In a preferred embodiment, the bridge comprises sections separated by connecting members, with each of the connecting members being sufficiently flexible to accommodate for the needed spacing constraints on each section.

14 Claims, 3 Drawing Sheets

FLEXIBLE BRIDGE FOR A WATCH MODULE

BACKGROUND OF THE INVENTION

This invention relates generally to the construction of timepieces, and more particularly, to the design and construction of an improved bridge (i.e. the complementary part that is typically fixed to the main plate to form the frame of a watch movement) for use therein.

As is well known in the art, such bridges provide several functions, some of which are to provide mounts onto which gears or driving wheels may be rotateably secured, or to provide apertures through which gear/wheel stems may be positioned, to assist in maintaining the positioning of components of stepping motors such as the stators and rotors thereof, to provide a guiding support for many of the gears in a typical gearing assembly, and to provide for the construction of a compact and secured module in the watch. As such (and as actually shown in FIG. 2 which is the subject matter of the present invention), the front (i.e. motor) side of a bridge usually has many grooves, flanges and guides within which the motor wheels, gears, or other structures are positioned or supported. In the past, watch designers have used both metal and plastic for such bridges.

A solid one-piece plastic bridge has been found to be satisfactory when used in simple watch designs, such as in a typical 3-hand movement (not a chronograph) watch, wherein only one stepping motor is needed. The reason that such a one-piece bridge has been found to be satisfactory is because such bridges are typically small, such as 10 mm wide, and the allowable tolerances are usually easy to stay within. That is, within this 10 mm surface area, all the molded grooves, flanges and guides must be aligned very precisely so that even at the outer edges of such a surface, the gears and/or wheels (for example) do not rub up against the sidewalls of the grooves within which they are positioned, and within such a small surface area, current molding technology can provide for precision (i.e. tolerances) on the order of 10 μm. With only one motor, such tolerances are acceptable.

However, as one starts to require larger bridges because of multiple motors, for example, the molding technology and the inherent characteristics of the plastic bridge material itself (bending, shrinkage, etc.) significantly increases the prior acceptable margin of error. That is, as the bridge surface becomes larger, precise dimensions and relative measurements cannot be maintained across the entire bridge surface. This becomes a significant problem when multiple stepping motors are used, such as in a chronograph watch, because now, the molding technology and inherent characteristics of the bridge material itself cannot maintain the aforementioned 10 μm margin of error across the entire bridge surface. In fact, it has been found that when multiple motors are used, increases in what was otherwise acceptable deviations across an entire bridge begin to increase unacceptably, for example upwards of up to 20 μm. As such, when strict tolerances and precise measurements across an entire bridge are needed, such as when there are multiple motors located relatively far apart in different locations in the watch casing, a satisfactory one-piece plastic bridge has been difficult to manufacture.

For this reason, the construction of an optimal one-piece bridge, at least in plastic which is more economical and lightweight than metal, has been elusive.

FIG. 1 illustrates an exemplary conventional one-piece bridge for use in a chronograph watch, showing both a frame assembly 3 and the aforementioned one-piece bridge 2.

One solution to the aforementioned problem is simply to provide a plurality of disconnected sectional bridges, i.e. physically separated bridge sections. At first glance, this would seem to provide a way to keep the tolerances precise over each particular section. However, such a multipart construction requires multiple molds and precision and timely construction techniques since each section would warrant separate placement in the watch, thereby leading to increased costs, manufacturing time, and likelihood of errors, all of which are undesirable. Hence the use of a one-piece bridge is significantly more beneficial.

Unfortunately, the prior art has yet to construct a bridge that both achieves the desired needs while simultaneously overcoming the drawbacks set forth above. Accordingly, further developments in the construction of timepieces, and bridge for use therein in particular, are needed.

SUMMARY OF THE PRESENT INVENTION

Generally speaking, it is an object to provide an improved bridge construction for use in a watch that achieves the desired needs while simultaneously overcoming the drawbacks set forth above.

Specifically, it is an object of the present invention to provide an improved bridge for use in a timepiece that has multiple stepping motors.

It is another object of the present invention to provide a bridge for a timepiece that compensates for the perceived deficiencies in the currently available molding technology and the inherent characteristics of a plastic bridge material itself.

It is yet another object of the present invention to provide a bridge for a timepiece that can maintain precise dimensions and relative measurements across the entire bridge surface.

It is still another object of the present invention to provide a bridge for a timepiece that can maintain acceptable tolerances across each section of the bridge, such as in the neighborhood, of about 10 μm.

Yet another object of the present invention is to provide a bridge for a timepiece that can adhere to strict tolerances and precise measurements, even when multiple motors are incorporated therein Still another object of the present invention is to provide such a bridge made of plastic.

And still further another object of the present invention is to provide such a bridge using only one molded piece of plastic.

Yet another object of the present invention is to provide such a bridge that is more economical and lightweight than prior art plastic bridges, thus being relatively easy and inexpensive to manufacture, resulting in reduced production and assembly costs.

And it is yet a further object of the present invention is to provide an improved bridge construction that provides for the needed precision in those regions where precision tolerances are needed in the watch module.

Still other objects and advantages of the invention will in part be obvious and will in part be apparent from the specification.

The invention accordingly comprises the features of construction, combination of elements and arrangement of parts and sequence of steps, which will be exemplified in the construction hereinafter set forth, and the scope of the invention will be indicated in the claims.

Therefore, in accordance with the present invention, a one-piece molded plastic bridge for use in a timepiece module that itself comprises a frame assembly, at least two stepping motors each comprising at least a stator and rotor, and a plurality of gears assemblies, is provided. In a preferred embodiment, the bridge comprises a first section having a first top surface area; a second section, having a second top surface area, and spaced apart from the first section and a first connecting member connecting the first section to the second section; wherein each of the first and second surface areas of the respective first and second sections are substantially larger than the surface areas of the connecting member.

In another preferred embodiment, the bridge will comprise three sections, each having a top surface area; connecting members respectively connecting two sections together, again, wherein (i) each of the first, second and third surface areas of the respective first, second and third sections areas are substantially larger than the respective surface areas of each of the connecting members; (ii) a channel opening is formed and perimetered by the first, second and third connecting members and an inner edge of each of the respective first, second and third sections; and (iii) the channel opening is substantially larger in area than the surface area of any of the first, second or third connecting members.

In accordance with the foregoing, a method of manufacturing such a bridge is also provided, and comprises the steps of molding each section to accommodate the stepping motor and/or gear assembly to be contacted or supported by the respective bridge section; and providing sufficiently flexibility in each of the connecting members so that each of the sections can be properly aligned with respect to each of the respective stepping motors and/or gear assembly. In a particular procedure, the step of molding each section comprises the steps of designing the layout of each section taking into account the needed spacings for each stepping motor and gear assembly; anticipating needed alignment and spacing tolerances resulting from the molding apparatus used to mold each section and/or the inherent characteristics of the plastic used to construct the bridge; and providing that the alignment and spacing when measured between any two points on any respective section do not have a tolerance that exceeds about 10 μm.

BRIEF DESCRIPTION OF THE DRAWINGS

The above set forth and other features of the invention are made more apparent in the ensuing Detailed Description of the Preferred Embodiments when read in conjunction with the attached Drawings, wherein.

Identically labeled elements appearing in different ones of the above-described figures refer to the same elements but may not be referenced in the description for all figures.

DETAILED DESCRIPTION OF THE PREFERRED EMBODIMENTS

Prior to making specific reference to the Figures, it should be understood that omitted herein are certain basic and very well known concepts regarding the construction of an analog or chronograph watch. Accordingly, reference shall be made only to the important and material features of the present invention, namely the shape and construction of the bridge of FIGS. 2 and 3, since it is assumed that one skilled in the art would be well able to construct an analog watch with the improved bridge disclosed herein, once said disclosure regarding the bridge has been made. Therefore, what will now be disclosed will completely enable one skilled in the art to construct a timepiece that incorporates an improved bridge in accordance with the present invention.

Figure 2:
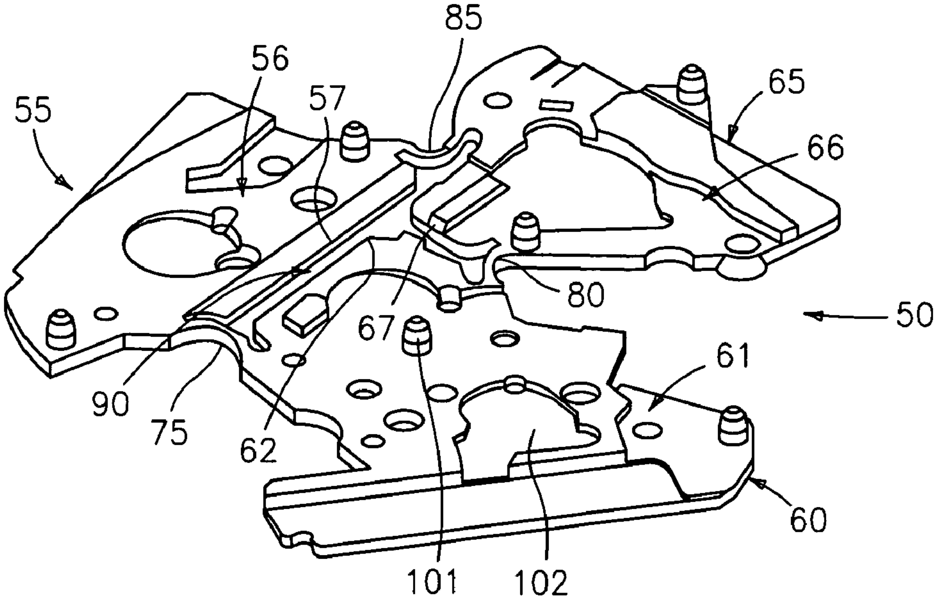
FIG. 2 is a perspective view of a bridge constructed in accordance with the present invention.
Figure 3:
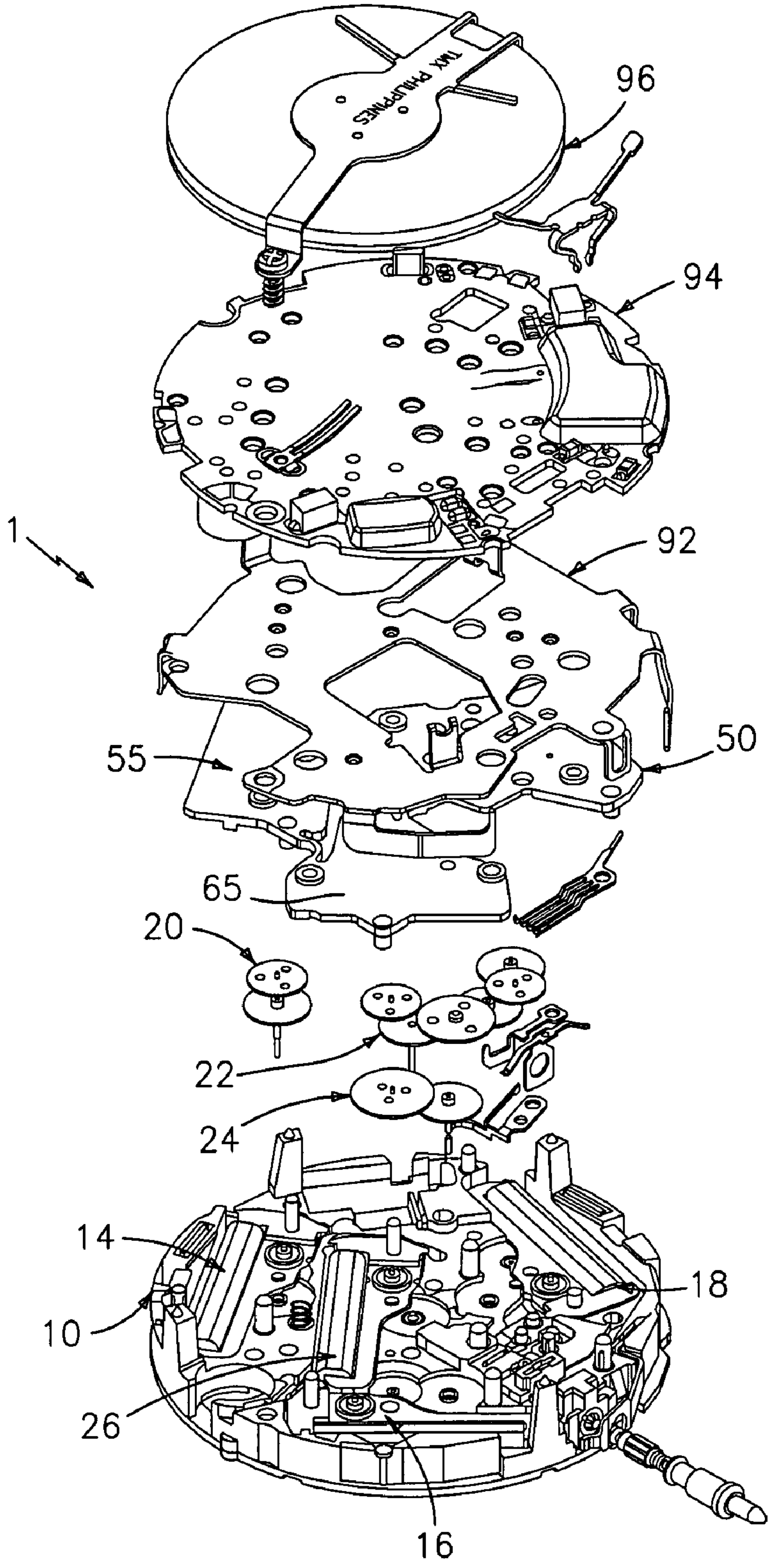
FIG. 3 is an exploded view, taken from the movement side of the timepiece, of a module incorporating the bridge of FIG. 2.
Figure 4:
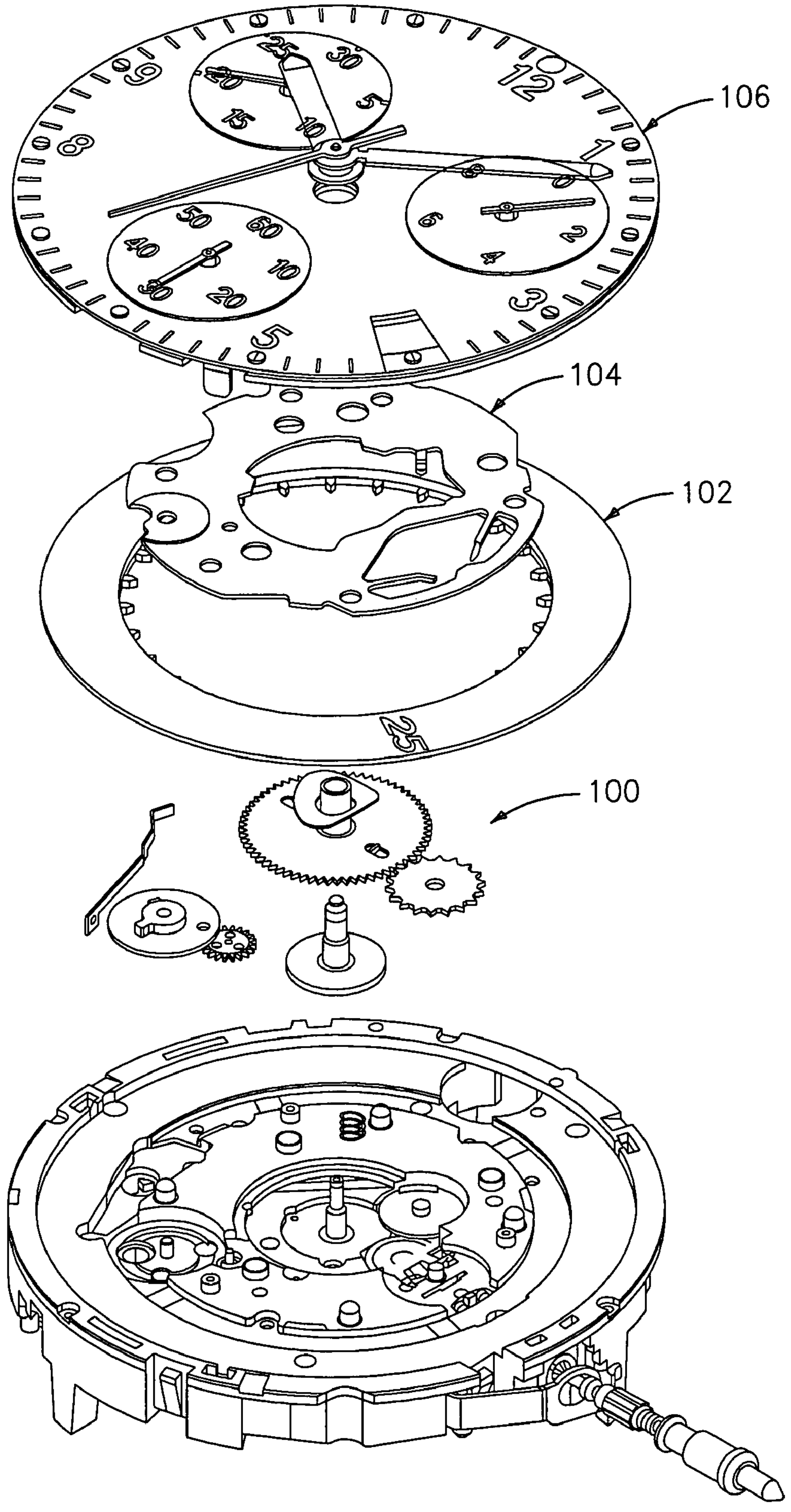
FIG. 4 is an exploded view, taken from the dial side of the timepiece, of the module of FIG. 3 incorporating the bridge of FIG. 2.

Accordingly, taking the following disclosure in connection with the Figures herein, it will be seen that the present invention is directed to an improved bridge, as specifically seen in FIG. 2, for use in a timepiece, the movement side of which is illustrated in FIG. 3, and for which the dial sided construction is illustrated in FIG. 4 for completeness. As such, the present invention can equally be seen to be applicable to an improved timepiece construction.

Generally speaking therefore, the Figures are seen to disclose a bridge 50, constructed in accordance with the present invention and for use in a timepiece (generally indicated at 1). As can be seen on the movement side of the timepiece of FIG. 3, the timepiece itself can easily be seen to comprise a frame assembly, generally indicated at 10, and at least three stepping motors, each respectively and generally indicated at 14, 16 and 18. Each stepping motor 14, 16 and 18 can be seen to comprise its own stator and rotor. A plurality of gearing assemblies, generally indicated at 20, 22 and 24, are also provided, the construction and positioning thereof being well within the purview of one skilled in the art. Although not material to the present invention, it can be seen that timepiece 1 includes yet a fourth stepping motor, generally indicated at 26. This four stepping motor arrangement is not new in the art, and is employed in many conventional chronograph watches, such as that described in U.S. Pat. No. 5,473,580, the disclosure of which, for purposes of disclosing and enabling the general construction of a watch with a plurality of stepping motors, is incorporated by reference as if fully set forth herein. Exemplary stepping motors are described in U.S. Pat. Nos. 4,647,218; 4,720,644; and 4,744,066, the disclosures of which are incorporated by reference as if fully set forth herein.

Overlying frame assembly 10, and in accordance with the present invention, is bridge 50.

Specifically, bridge 50 preferably comprises a first section 55, a second section 60 spaced apart from first section 55, and a third section 65 spaced apart from the first and second sections 55 and 60. It can be seen that each of the respective sections comprise top surface areas, generally indicated at 56, 61 and 66, respectively.

Interconnecting the aforementioned three sections are connecting members. Specifically, a first connecting member 75 connects first section 55 to second section 60, a second connecting member 80 connects second section 60 to third section 65, and a third connecting member 85 connects third section 65 area to first section 55.

Figure 1:
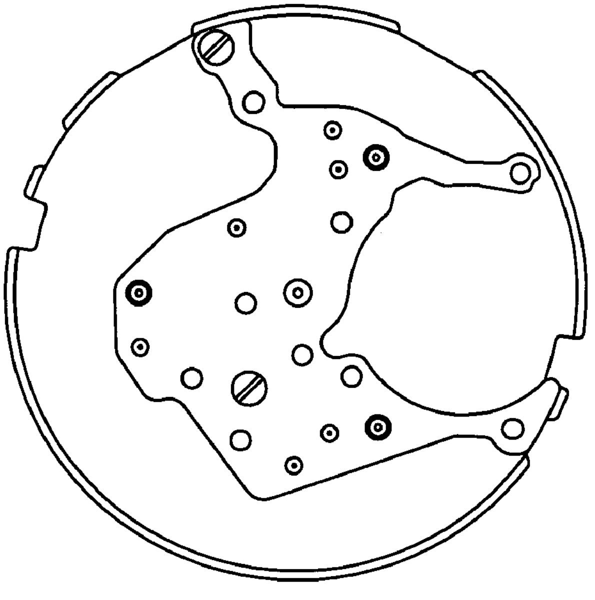
FIG. 1 (PRIOR ART)
FIG. 1 is a view of an exemplary one-piece conventional bridge in a timepiece used in a chronograph watch.

It can also be seen that each of the first, second and third sections are substantially larger than each of the connecting members. In this way, the thinness of the connecting members allows and provides for the needed independent flexing of sections 55, 60 and 65. The ability to provide individualized flexing cannot be achieved with one large bridge surface area, such as the bridge of FIG. 1.

Preferably, all three connecting members 75, 80 and 85 and all three sections 55, 60 and 65 are all formed of plastic, such as polycarbonate, and in fact are integrally formed, such as during molding thereof.

To obtain the advantages set forth above, top surface area 56 of first section 55 is approximately 75 $mm^2$, top surface area 61 of the second section 60 is approximately 120 $mm^2$, and top surface area 66 of third section 65 is approximately 75 $mm^2$. Furthermore, the dimensions of first connecting member 75 are approximately r=1 mm; R=1.3 mm; arc length=2.45 mm; thickness=0.5 mm, (where r is the inner radius of the connecting member and R is the outer radius thereof), the dimensions of second connecting member are approximately r=1 mm; R=1.3 mm; arc length=1.25 mm; thickness=0.5 mm and the dimensions of the third connecting member are approximately r=1 mm; R=1.3 mm; arc length=2 mm; thickness=0.5 mm. That is, the total surface area of the first connecting member is approximately 0.75 $mm^2$, the total surface area of the second connecting member is approximately 0.38 $mm^2$ and the total surface area of the third connecting member is approximately 0.6 $mm^2$.

As can also be seen in FIG. 2, a channel opening, generally indicated at 90 is formed and perimetered by the first, second and third connecting members 75, 80 and 85 and the respective inner edges (57, 62 and 67) of each of the respective first, second and third sections 55, 60 and 65. Preferably, channel opening 90 is substantially larger in surface area (approximately 15 $mm^2$) than the width, length and surface area of each of the first, second and third connecting members. In this way, one can be assured that bridge 50 provides the needed flexibility.

Figure 5:
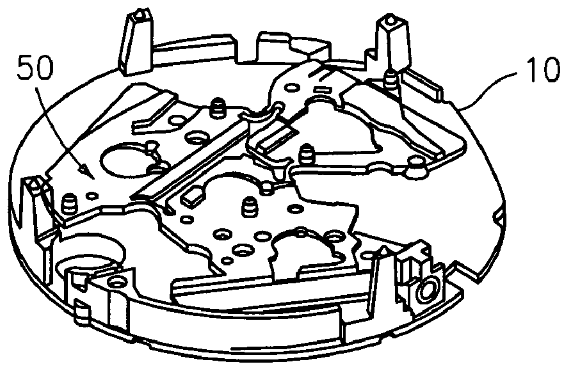
FIG. 5 illustrates the bridge of the present invention mounted on a frame assembly.

A plurality of mounts 52 may be provided for insertion in a corresponding plurality of bores in frame assembly 10, so as to provide the orientation, coupling and securing of bridge 50 to frame assembly 10. Additionally, or in lieu thereof, apertures may be provided in bridge 50 with corresponding posts provided on frame assembly 10. FIG. 5 illustrates bridge 50 mounted on frame assembly 10, with posts extending through apertures in bridge 50.

Taking advantage of the improved construction of bridge 50, FIG. 3 illustrates that at least one stepping motor, such as motor 14, lies intermediate section 55 and frame assembly 10, while a second stepping motor, such as motor 16, lies intermediate section 65 and frame assembly 10, and at least a third stepping motor, such as motor 18, lies intermediate section 60 and frame assembly 10. FIG. 3 also illustrates that fourth motor 26 lies partially under all three sections 55, 60 and 65. FIG. 2 illustrates depending flanges that help orientate the position of the magnets on each stator.

FIG. 3 shows the construction of certain remaining components on the movement side of the timepiece 1 of the present invention; namely, that overlying bridge 50 is an insulator 92, while on top thereof lies a printed circuit board assembly 94 and a battery 96. Other parts are illustrated in FIG. 3, and their function and coupling to timepiece 1 to construct an operational timepiece is well known in the art.

To this end, FIG. 4 illustrates certain other components that are found on the dial side of timepiece 1, such as a plurality of gears, generally indicated at 100, a ring date 102 for providing a date display function, a plate holder 104, and a dial 106, all of which can be constructed in accordance with well known technology.

Most importantly, a bridge constructed in accordance with the present invention compensates for the perceived deficiencies in the currently available molding technology and the inherent characteristics of a plastic bridge material itself. That is, the present disclosed bridge can maintain the needed precise dimensions and relative measurements across the entire bridge surface, because each section can be perceived as an individual bridge. Specifically, the bridge can maintain acceptable tolerances across each section of the bridge, such as in the neighborhood, of about 10 μm, and can adhere to strict tolerances and precise measurements, even when multiple motors are incorporated therein.

All of the foregoing advantages are achieved by a bridge constructed as set forth above, and by the following method, and specifically by (i) molding each section to accommodate the stepping motor and/or gear assembly to be contacted or supported by the respective bridge section and (ii) providing sufficiently flexibility in each of the connecting members so that each of the sections can be property aligned with respect to each of the respective stepping motors and/or gear assembly. More specifically, the step of molding each section comprises the steps of (i) designing the layout of each section taking into account the needed spacings for each stepping motor and gear assembly; (ii) anticipating needed alignment and spacing tolerances resulting from the molding apparatus used to mold each section and/or the inherent characteristics of the plastic used to construct the bridge; and (iii) providing that the alignment and spacing when measured between any two points on any respective section do not have a tolerance that exceeds about 10 μm.

As an exemplary measurement, reference is again made to FIG. 2, wherein two reference points 101 (a stem for mounting) and an aperture 102 for a wheel center, are specifically identified. The advantage of the present invention is that the required spacing between these two points 101, 102 can be maintained, because the alignment and spacing and allowable tolerances for each section can be individually set. The flexibility of the connecting members allows each section to be properly aligned, and that any misalignment is absorbed (i.e. compensated for) by the flexing of the one or more connecting members. As such, the proper spacing and alignments (and staying within the required tolerances) can be enjoyed by each section 55, 60 and 65 individually and collectively.

While the invention has been particularly shown and described with respect to preferred embodiments thereof, it will be understood by those skilled in the art that changes in form and details may be made therein without departing from the scope and spirit of the invention.

For example, the present invention is equally applicable to bridges only requiring two sections, as defined herein, and is thus disclosed and claimed herein. Moreover, bridge 50 can be seen in FIG. 2 to comprise a plurality of impressions in which gears or wheels or other components can snugly fit. It should be clear that the alignment of the gears and other components are a matter of design choice and depends only on the alignment of parts selected by the watch designer.

Moreover, the present invention has been disclosed above with particular reference to timepieces, such as wristwatches. However, one skilled in the art shall now appreciate that the present invention is equally applicable, and as claimed herein, to devices other than wristwatches, such as, but not limited, pocket watches or similarly constructed clocks.

What is claimed is:

1. A bridge for use in a timepiece module that itself comprises a frame assembly, at least three stepping motors each comprising at least a stator and rotor, and a plurality of gears assemblies, wherein the bridge comprises:

a first section having a first top surface area;

a second section, having a second top surface area, and spaced apart from the first section;

a third section, having a third top surface area, and spaced apart from the first and second sections;

a first connecting member connecting the first section to the second section, a second connecting member connecting the second section to the third section and a third connecting member connecting the third section to the first section;

wherein:

each of the first, second and third surface areas of the respective first, second and third sections areas are substantially larger than the respective surface areas of each of the connecting members;

a channel opening is formed and perimetered by the first, second and third connecting members and an inner edge of each of the respective first, second and third sections; and the channel opening is substantially larger in area than the surface area of any of the first, second or third connecting members; and wherein one of the stators and rotors lie intermediate the first section and the frame assembly;

another stator and rotor lies intermediate the second section and the frame assembly; and at least a third stator and rotor lies intermediate the third section and the frame assembly.

2. The bridge as claimed in claim 1, wherein the first, second and third connecting members and the respective first, second and third sections are all formed of plastic.

3. The bridge as claimed in claim 2, wherein the first, second and third connecting members and the respective first, second and third sections are all integrally formed.

4. The bridge as claimed in claim 1, wherein the top surface area of the first section is approximately 75 $mm^2$, the top surface area of the second section is approximately 120 $mm^2$, and the top surface area of the third section is approximately 75 $mm^2$.

5. The bridge as claimed in claim 1, wherein the dimensions of the first connecting member are approximately r=1 mm; R=1.3 mm; arc length=2.45 mm; thickness=0.5 mm (where r is the inner radius of the connecting member and R is the outer radius thereof), the dimensions of the second connecting member are approximately r=1 mm; R=1.3 mm; arc length=1.25 mm; thickness=0.5 mm, and the dimensions of the third connecting member are approximately r=1 mm; R=1.3 mm; arc length=2 mm; thickness=0.5 mm.

6. The bridge as claimed in claim 5, wherein the total surface area of the first connecting member is approximately 0.75 $mm^2$, the total surface area of the second connecting member is approximately 0.38 $mm^2$ and the total surface area of the third connecting member is approximately 0.6 $mm^2$.

7. A timepiece that incorporates the bridge as claimed in claim 1.

8. A bridge for use in a timepiece module that itself comprises a frame assembly, at least two stepping motors each comprising at least a stator and rotor, and a plurality of gears assemblies, wherein the bridge comprises:

a first section having a first top surface area;

a second section, having a second top surface area, and spaced apart from the first section;

a first connecting member connecting the first section to the second section;

wherein:

each of the first and second surface areas of the respective first and second sections are substantially larger than the surface area of the connecting member;

wherein the bridge is constructed from one piece of molded plastic; and wherein one of the stators and rotors lie intermediate the first section and the frame assembly; and another stator and rotor lies intermediate the second section and the frame assembly.

9. A timepiece that incorporates the bridge as claimed in claim 8.

10. A method of manufacturing a bridge for use in a timepiece module that itself comprises a frame assembly, at least three stepping motors each comprising at least a stator and rotor, and a plurality of gears assemblies, wherein the bridge comprises a first section having a first top surface area; a second section having a second top surface area and spaced apart from the first section; a third section having a third top surface area and spaced apart from the first and second sections; a first connecting member connecting the first section to the second section, a second connecting member connecting the second section to the third section and a third connecting member connecting the third section to the first section, wherein each of the first, second and third surface areas of the respective first, second and third sections areas are substantially larger than the respective surface areas of each of the connecting members; and a channel opening formed and perimetered by the first, second and third connecting members and an inner edge of each of the respective first, second and third sections, wherein the channel opening is substantially larger in area than the surface area of any of the first, second or third connecting members; wherein the method comprises the steps of:

molding each section to accommodate the stepping motor and/or gear assembly to be contacted or supported by the respective bridge section;

providing sufficiently flexibility in each of the connecting members so that each of the sections can be properly aligned with respect to each of the respective stepping motors and/or gear assembly.

11. The method as claimed in claim 10, wherein the step of molding each section comprises the steps of:

designing the layout of each section taking into account the needed spacings for each stepping motor and gear assembly;

anticipating needed alignment and spacing tolerances resulting from the molding apparatus used to mold each section and/or the inherent characteristics of the plastic used to construct the bridge; and providing that the alignment and spacing when measured between any two points on any respective section do not have a tolerance that exceeds about 10 μm.

12. A bridge for use in a timepiece module that itself comprises a frame assembly, at least three stepping motors each comprising at least a stator and rotor, and a plurality of gears assemblies, wherein the bridge comprises:

a first section having a first top surface area;

a second section, having a second top surface area, and spaced apart from the first section;

a third section, having a third top surface area, and spaced apart from the first and second sections;

a first connecting member connecting the first section to the second section, a second connecting member connecting the second section to the third section and a third connecting member connecting the third section to the first section;

wherein:

each of the first, second and third surface areas of the respective first, second and third sections areas are substantially larger than the respective surface areas of each of the connecting members;

a channel opening is formed and perimetered by the first, second and third connecting members and an inner edge of each of the respective first, second and third sections; and the channel opening is substantially larger in area than the surface area of any of the first, second or third connecting members;

wherein the bridge is constructed from one piece of molded plastic.

13. The bridge as claimed in claim 12, wherein each of the connecting members has sufficiently flexibility so that each of the sections can be properly aligned with respect to each of the respective stepping motors and/or gear assemblies.

14. The bridge as claimed in claim 13, wherein the alignment and spacing between any two points on any respective section do not exceed a tolerance of about 10 μm.

* * * * *